United States Patent [19]

Randall, Jr. et al.

[11] Patent Number: 5,066,723

[45] Date of Patent: Nov. 19, 1991

[54] IMPACT-MODIFIED POLYMERS (P-1304)

[75] Inventors: James C. Randall, Jr., Seabrook; Terrence Huff, Baytown, both of Tex.

[73] Assignee: Exxon Chemical Patents Inc., Linden, N.J.

[21] Appl. No.: 632,179

[22] Filed: Dec. 21, 1990

Related U.S. Application Data

[63] Continuation of Ser. No. 219,681, Jul. 15, 1988, abandoned.

[51] Int. Cl.$^5$ .................... C08L 23/26; C08L 23/10; C08L 23/04; C08F 297/08
[52] U.S. Cl. .................................. 525/194; 525/240; 525/243; 525/322; 525/323; 522/112
[58] Field of Search ............... 525/322, 323, 194, 240; 522/112

[56] References Cited

U.S. PATENT DOCUMENTS

| | | | |
|---|---|---|---|
| 3,144,436 | 8/1964 | Greene et al. | 260/93.7 |
| 3,200,173 | 8/1965 | Schilling | 260/878 |
| 3,420,916 | 1/1969 | Liu et al. | 260/897 |
| 3,598,885 | 8/1971 | Peters | 260/878 |
| 3,629,368 | 12/1971 | Fukuda et al. | 260/878 B |
| 3,887,534 | 6/1975 | Baba et al. | 260/93.7 |
| 3,970,719 | 7/1976 | Edmonds, Jr. | 260/878 B |
| 4,039,632 | 8/1977 | Edmonds, Jr. | 260/878 B |
| 4,061,694 | 12/1977 | Castagna | 260/878 B |
| 4,127,504 | 11/1978 | Ueno et al. | 252/429 B |
| 4,128,606 | 12/1978 | Furutachi et al. | 260/878 B |
| 4,143,099 | 3/1979 | Duncan | 260/897 A |
| 4,212,787 | 6/1980 | Matsuda et al. | 260/33.6 |
| 4,316,966 | 2/1982 | Mineshima et al. | 525/53 |
| 4,330,649 | 5/1982 | Kioka et al. | 526/125 |
| 4,375,531 | 3/1983 | Ross | 525/93 |
| 4,459,385 | 9/1984 | McCollough | 525/88 |
| 4,478,951 | 10/1984 | Huff | 502/108 |
| 4,535,125 | 8/1985 | McCollough | 525/88 |
| 4,543,400 | 9/1985 | Wristers | 526/119 |
| 4,547,552 | 10/1985 | Toyota et al. | 525/247 |

FOREIGN PATENT DOCUMENTS

| | | |
|---|---|---|
| 45975 | 2/1982 | European Pat. Off. . |
| 52121060 | 8/1974 | Japan . |
| 56-041205 | 9/1981 | Japan . |
| 57-065747 | 9/1982 | Japan . |
| 51147528 | 12/1982 | Japan . |
| 58-084838 | 4/1983 | Japan . |
| 58-210949 | 5/1983 | Japan . |

OTHER PUBLICATIONS

Nakamura et al., "Co-Crosslinking Blend of Incompatible Polymers VI: Polylvinyl Chloride) Toughened with Polyethylene via a Co-Crosslinking Technique", Journal of Materials Science, 21 (1986) 4485-88.

Stehling et al., "Structure and Properties of Rubber-Modified Polypropylene Impact Blends", Journal of Applied Polymer Science, 21 (1981) 2693-2711.

Primary Examiner—Carman J. Seccuro
Attorney, Agent, or Firm—M. B. Kurtzman; Jaimes Sher

[57] ABSTRACT

Impact-modified polymeric materials are produced by visbreaking certain reactor blends. In a preferred embodiment, impact-modified polypropylene materials are produced by visbreaking a reactor blend of polypropylene and thermoplastic polyethylene. The polypropylene material is preferably homopolypropylene having a melt flow rate of less than about 1 dg/min. Such impact-modified polymeric materials manifest unexpected compatibility characteristics, increased impact resistance at low temperatures, improved antiblush characteristics and improved flow characteristics.

17 Claims, No Drawings

IMPACT-MODIFIED POLYMERS (P-1304)

This application is a continuation of application Ser. No. 219,681, filed 7-15-88, now abandoned.

BACKGROUND OF THE INVENTION

1. Field of the Invention

The present invention relates to polymeric materials, preferably polypropylene based polymeric materials, having improved impact resistance and, more particularly, relates to visbroken reactor blends of free radical crosslinkable thermoplastic olefin polymers, such as thermoplastic polyethylene materials, and free radical decomposable olefin polymers, such as polypropylene materials, preferably high molecular weight polypropylene materials. The visbroken reactor blends of the present invention manifest high resistance to impact at low temperatures and have excellent stiffness and flow characteristics. Most importantly, the subject visbroken reactor blends comprise a continuous olefin polymeric phase and a dispersed thermoplastic olefin polymeric phase wherein improved adhesion characteristics are achieved between the dispersed and continuous phases, due in part to the presence of grafts. The grafts comprise a portion of free radical decomposable olefin polymer fragmented, or visbroken, material grafted to a portion of the free radical crosslinkable thermoplastic material. These grafts serve as compatibilizers or surface active agents between the phases. In a preferred embodiment, the free radical decomposable olefin polymer is polypropylene and the free radical crosslinkable thermoplastic olefin polymer is polyethylene. Preferably, the polypropylene material utilized is a high molecular weight material so that more polypropylene fragments are available for grafting and a larger amount of surface active grafts are thus provided to improve adhesion between the dispersed and continuous phases. The visbroken reactor blends of the present invention are particularly characterized by the fact that they do not include rubber materials yet manifest significantly improved low temperature impact resistance while maintaining excellent stiffness characteristics.

2. Prior Art

The present invention resides in the discovery that improved impact-modified polypropylenes are obtained by visbreaking a reactor blend of polypropylene and thermoplastic polyethylene. Polypropylene is known to be deficient in resistance to impact at low temperatures, i.e., 5° C. and below. Polypropylene materials which have been modified to improve resistance to impact are generally referred to as impact-modified polypropylenes. Heretofore, impact resistance of polypropylene has been improved by blending impact resistant materials such as elastomeric ethylene-propylene copolymers therewith or by reacting therewith other polymers or copolymers to produce reactor blends typically referred to as impact copolymers. There is, however, a tradeoff with other properties, e.g., stiffness and flow characteristics, when such polypropylene materials are impact-modified. For example, U.S. Pat. No. 4,459,385 discloses that impact-modified polypropylenes obtained by sequential polymerization of propylene, and ethylene and propylene, to obtain an impact copolymer of polypropylene homopolymer and elastomeric ethylene-propylene copolymer, while having good impact resistance at low temperatures, have decreased stiffness. This reference teaches that as a general rule, impact resistance increases and stiffness decreases with increasing amounts of elastomer in the total composition. Such patent also discloses that the decrease in stiffness can be compensated for by blending with the impact-modified material a linear low density polyethylene (LLDPE) having a melt flow index not exceeding 5 dg/min. U.S. Pat. No. 4,535,125 discloses that impact-modified polypropylenes blended with a LLDPE have poor flow performance and that such flow performance is improved through visbreaking. That is, the melt flow rate of the blend of impact copolymer and LLDPE can be increased by extruding the blend in the presence of certain peroxide materials. Thus, impact-modified polypropylenes are blended with a LLDPE having a melt flow index of from 5 to 50 dg/min and the blends are visbroken to obtain impact-resistant polypropylene materials which have good stiffness characteristics as well as good flow characteristics.

Other methods of preparing impact-modified polypropylenes are also known. For example, U.S. Pat. No. 4,375,531 discloses blends of a first component selected from a group of medium impact polymeric materials with a second component selected from a group of high impact polymeric materials which blends are visbroken to improve the flow characteristics thereof.

It can be seen from the prior art that impact resistant polypropylenes having good flow and stiffness characteristics are prepared starting with polypropylene materials which have already been impact-modified, i.e., contain elastomers and the like, and blending therewith another material such as LLDPE to improve the stiffness characteristics of the impact-modified polypropylene followed by visbreaking the blend to improve the flow characteristics of the blend. However, such products manifest an undesirable balance between impact resistance and stiffness. Furthermore, products produced from such materials exhibit "blushing" or "stress whitening" upon impact which gives an appearance of a defective product.

It has now been discovered that, contrary to the teachings of the prior art, high-impact resistant polypropylene materials which do not contain rubber materials, such as ethylene-propylene rubber, and which do not contain stiffness modifiers, such as LLDPE, yet have excellent flow and stiffness characteristics as well as superior antiblush characteristics, are obtained by visbreaking reactor blends of thermoplastic polyethylene and polypropylene materials preferably prepared in the absence, or essential absence, of chain transfer agents such as hydrogen. That is, by restricting the flow of hydrogen, or other chain transfer agents typically utilized to control melt flow rate during sequential polymerizations, and subsequently visbreaking the reactor blended copolymers or sequentially polymerized copolymers, impact resistant polypropylene materials having superior impact resistance, stiffness and antiblush characteristics can be produced without adding an impact modifying component such as EP rubber.

Accordingly, the subject invention provides high impact resistant visbroken reactor blends suitable for use in various applications, such as in molded products, wherein the products produced are significantly superior than those of the prior art. In addition, the improved impact-modified polymers of this invention are prepared in a more convenient manner and at a substantial cost savings as compared to the prior art materials.

SUMMARY OF THE INVENTION

This invention is directed to impact-modified polymers comprising visbroken reactor blends of free radical decomposable olefin polymers and free radical crosslinkable thermoplastic olefin polymers. In a preferred embodiment, the impact-modified polymer is impact-modified polypropylene obtained by visbreaking a reactor blend of polypropylene and thermoplastic polyethylene materials. The impact-modified polymers exhibit high impact resistance at low temperatures and have excellent flow, stiffness and antiblush characteristics. Furthermore, these impact-modified polymers manifest unexpected compatibility characteristics.

The present invention resides in the discovery that improved impact-modified polypropylenes can be obtained from certain visbroken reactor blends. The certain visbroken reactor blends are those reactor blends of thermoplastic polyethylene materials and polypropylene materials having at least about 90 wt.% propylene. Such materials are preferably prepared essentially in the absence of chain terminating agents such as hydrogen. Thus, the impact copolymers of the present invention are characterized by low melt flow rates prior to visbreaking. The visbreaking process can then be utilized to obtain a product having a desired melt flow rate. By "essentially in the absence of chain terminating agents" it is meant that the flow of such agents is restricted during the sequential polymerization process to that which is necessary to produce a polymer material which is adapted to be melt blended during the visbreaking process.

Typically, reactor blend materials are prepared utilizing significant amounts of hydrogen or other chain terminating agents in order to control the melt flow rate of both intermediates, e.g. homopolymer made in the first reactor and copolymer made in the second reactor, so that the reactor blend product is of a melt flow rate such as to permit processing in commercial applications.

By contrast, in the present invention, the flow of chain terminating agents, such as hydrogen, is restricted with the effect that the resulting reactor blend has a low melt flow rate, i.e., high molecular weight. Upon visbreaking of the low melt flow rate blend, i.e., high molecular weight material, the number of fragments of reactor blend material can be controlled to produce a product having a desired melt flow rate. More importantly, the number of grafts and blocks, as discussed below, can now be controlled in order to facilitate control of impact strength, stiffness and antiblushing. Accordingly, the present invention is directed to impact-modified polypropylene compositions having excellent stiffness and flow characteristics as well as superior antiblushing characteristics.

In accordance with the present invention, there is provided a high impact polypropylene which comprises a reactor blend of polypropylene, preferably substantially isotactic high molecular weight homopolypropylene, and a thermoplastic polyethylene material, wherein the continuous phase of the reactor blend is the polypropylene and the dispersed phase is the polyethylene material.

By reactor blend, it is meant an in situ blend produced by polymerizing one or more monomers in the presence of another polymer, with at least some living catalyst being present during the polymerization. The resulting reactor product is a highly dispersed blend of the various polymers in which the components are mechanically inseparable.

The polypropylene material may comprise homopolypropylene or a copolymer of propylene with minor amounts of other comonomers, preferably one or more of $C_2$ or $C_4$ to $C_{10}$ alpha-olefins. Such minor amounts include amounts of up to about 10 wt.%.

The polyethylene may comprise homopolyethylene or a copolymer of ethylene with minor amounts of one or more other comonomers, preferably one or more of $C_3$ to $C_{10}$ alpha-olefins. The comonomer is present in the polyethylene in minor amounts of up to about 10% by weight, with more preferred ranges described below.

The high impact polypropylene of the present invention is produced in a series reactor system, either continuously or batchwise. Preferably, a substantially isotactic homopolypropylene is produced in a first reactor and the thermoplastic polyethylene is produced in a second reactor in the presence of the outlet stream from the first reactor. As a final step, the reactor blend from the second reactor is preferably melt admixed with an organic peroxide in effective amounts and under conditions to improve impact resistance of the reactor blend, particularly at low temperatures.

High impact polypropylenes in accordance with the present invention offer numerous advantages over conventional polypropylenes, including a more desirable stiffness/impact balance and improved resistance to stress whitening.

The high impact polypropylenes of the present invention are especially suited for use in molding applications to produce battery cases, automotive trim and the like.

DESCRIPTION OF THE INVENTION

The high impact polymers of the present invention comprise a visbroken reactor blend of a continuous phase comprising a free radical decomposable olefin polymer, such as a polypropylene material, preferably, of high molecular weight, most preferably, a high molecular weight substantially isotactic homopolypropylene, and a dispersed phase comprising a free radical crosslinkable thermoplastic olefin polymer, such as a thermoplastic polyethylene material, preferably a thermoplastic ethylene copolymer.

Reactor blend, as that term is used herein, refers to a highly dispersed and mechanically inseparable blend of various polymers produced in situ as a result of the sequential polymerization of one or more monomers in the presence of a first polymer including some live catalyst from the first polymerization, with the formation of a second polymer in the presence of this first polymer.

The high impact polymers of the present invention are exemplified by reference to a preferred embodiment directed to high impact polypropylene based materials obtained by visbreaking a reactor blend of polypropylene and thermoplastic polyethylene and the description of the invention is made with reference thereto. However, it is not intended that the present invention be limited thereto. Preferably the reactor blend comprises from about 70% to about 95%, more preferably from about 75% to about 90%, by weight of homopolypropylene based upon the combined weight of homopolypropylene and polyethylene materials. Conversely, the reactor blend comprises from about 5% to about 30%, more preferably from about 10% to about 25%, by weight of the polyethylene. This weight percent is based upon the combined total weight of homopolypropylene and polyethylene materials in the reactor blend.

The polypropylene material is preferably homopolypropylene but can include propylene based copolymers comprising at least about 90 wt.% propylene with minor amounts, i.e., up to about 10 wt.%, of one or more other comonomers selected from $C_2$ and $C_4$ to $C_{10}$ alpha-olefins.

The thermoplastic polyethylene material may comprise homopolyethylene or a copolymer of ethylene with minor amounts of one or more other comonomers, selected from one or more of $C_3$ to $C_{10}$ alpha-olefins, preferably one or more of propylene, 1-butene or 1-hexene, and especially propylene. The comonomer is present in the thermoplastic polyethylene material preferably in minor amounts, such as about 10% by weight or less, more preferably from about 1% to about 10% by weight, still more preferably from about 3% to about 6% by weight, more preferably between about 4% to about 5% by weight. This weight percent is based upon the total weight of the polyethylene material. Such ethylene copolymers are commonly referred to as linear low density polyethylenes (LLDPE) and, for purposes of the present invention, are preferably prepared, as discussed below, in the presence of a homopolymer of propylene and the catalyst utilized to prepare such homopolymer, or is present along with live catalyst when the homopolymer is prepared.

The reactor blend is preferably produced in a sequential reactor system, either continuously or batchwise, with, preferably, the polypropylene being produced in a first reactor and the polyethylene being produced in a second reactor. More particularly, propylene and a high activity propylene polymerization catalyst are fed to a first reactor and the propylene polymerized to produce substantially isotactic polypropylene, preferably of high molecular weight, i.e., MFR of less than about 1 dg/min. For the purposes of the present discussion, the first reactor will be treated as a single reactor but may also comprise a series of reactors. This should not, however, be considered a limitation on the present invention.

The polymerization catalyst may comprise any one of a number of well-known high activity Ziegler-type catalysts suitable for producing propylene-based polymers. Particularly preferred catalysts include those described in U.S. Pat. Nos. 4127504, 4330649, 4543400 and 4547552, and European Pat. 45975, all of which are incorporated by reference for all purposes as if fully set forth herein. An especially preferred catalyst system comprises a particle form, magnesium halide supported, titanium halide based catalyst with an alkyl-aluminum based co-catalyst, as disclosed in some of the aforementioned references, and as commercially available under the trade designation TK-20 from Mitsui Petrochemical Company, Tokyo, Japan. Another preferred catalyst system comprises a titanium trichloride catalyst component, diethyl aluminum chloride co-catalyst and methyl methacrylate modifier, such as disclosed in other of the aforementioned incorporated references.

Of course, the amounts and types of catalyst component, co-catalyst and modifier utilized may vary widely depending upon reaction conditions and desired end products. Generally, the catalyst component is added to the first reactor in amounts ranging from about 100 ppm to about 300 ppm by weight based upon the weight of the propylene feed. From the particular type and amount of catalyst component utilized, the particular type and amount of co-catalyst and modifier may be chosen by one skilled in the art.

The propylene is preferably polymerized in a liquid phase, for example, in a stirred reactor at temperatures ranging from about 35° C. to about 85° C., more preferably from about 45° C. to about 85° C., and pressures given by the vapor pressure of the various components.

As previously indicated, a high molecular weight homopolypropylene is preferably produced from the first reactor. Therefore, it is preferred to restrict hydrogen or other well-known chain transfer agents to low levels. Depending upon reaction conditions, it may be necessary to introduce small amounts of such chain transfer agent into the first reactor to make the resulting polymer processible in subsequent mixing stages and to optimize properties. The need for and amount of chain transfer agent will be easily determinable by one skilled in the art depending upon the desired end homopolypropylene MFR and ultimate reactor blend MFR. The polypropylene material from the first reactor will preferably have an MFR (ASTM D1238, Condition L) of less than about 1.0 dg/min, more preferably less than about 0.5 dg/min, still more preferably less than about 0.2 dg/min, most preferably between about 0.01 dg/min and about 0.2 dg/min.

The resulting outlet stream from the first reactor, which will generally comprise the polypropylene, unreacted propylene and catalyst including some living catalyst, is first decompressed to allow vaporization of the liquid propylene then fed into a second reactor along with ethylene and, if desired, another comonomer as described above. The ethylene and comonomer are polymerized in the presence of the polypropylene, with the catalyst utilized in the first reactor continuing to act as the catalyst for the ethylene polymerization. If desired, another or additional high activity catalyst may also be fed to the second reactor to act in conjunction with the catalyst from the first reactor. This second reactor may also comprise a single reactor or series of reactors, and this again should not be considered a limitation on the present invention.

Unlike the propylene polymerization, the ethylene and, optionally, the comonomer, are preferably polymerized in a vapor phase reaction in, for example, a mechanically agitated gas phase reactor at temperatures ranging from about 60° C. to about 80° C. and pressures ranging from about 140 psig to about 240 psig. The concentration of ethylene in the gas phase will generally range from about 70 mol% to abut 100 mol%. It is well within the abilities of one skilled in the art to adjust these parameters to produce the desired polyethylene material.

Optionally, a chain transfer agent may be added to the second reactor to provide molecular weight control of the polyethylene to allow dispersal of any polyethylene gels which may form during the polymerization. An especially preferred chain transfer agent is hydrogen, which is generally utilized in amounts ranging from about 0.5 mol% to about 3.0 mol% in the vapor phase. Selection of the amount of chain transfer agent suitable for controlling gelation is well within the abilities of one skilled in the art.

The outlet stream from the second reactor may then be processed in any manner familiar in the art to recover the reactor blend. For example, the residue may be steam stripped to remove residual monomer, then dried with nitrogen gas. These finishing procedures are well-known in the art.

As a final step in the production of the high impact polypropylene of the present invention, the recovered reactor blend is visbroken utilizing any method for generating free radicals within the blend.

Preferably, the reactor blend is admixed and melt-blended with one or more organic peroxides. Various organic peroxides and admixing procedures are well-known in the art such as, for example, those disclosed in U.S. Pat. Nos. 4143099 and 4212787, both of which are incorporated by reference for all purposes as if fully set forth herein. Suitable organic peroxides include, for example, dicumyl peroxide, di-tert-butyl peroxide and 2,5-dimethyl-2,5-di(tert-butylperoxy)hexane.

The organic peroxides are utilized in amounts ranging from about 100 ppm to about 2500 ppm by weight based upon the weight of the reactor blend. The reactor blend and organic peroxide are melt mixed in, for example, a Banbury mixer, Farrel Continuous mixer, single screw extruder, twin screw extruder and the like, at temperatures ranging from about 175° C. to about 250° C., until the reactor blend is at the desired MFR. It is well within the skill in the art to choose the particular organic peroxide, mixing conditions, temperature and time based upon the physical properties of the initial reactor blend and desired end MFR.

Preferably, when the reactor blends are to be visbroken utilizing an organic peroxide, the organic peroxide is blended in the upstream section of the extruder along with the reactor blended material and then extruded at a temperature above the melting point of the polymers and high enough to decompose the organic peroxide. Standard techniques for visbreaking or, as it is sometimes referred to, the peroxide cracking, of polymers in an extruder, are well known and include the processes disclosed in U.S. Pat. No. 3,144,436 and U.S. Pat. No. 3,887,534. Preferred organic peroxides are those which have relatively high decomposition temperatures and produce volatile decomposition products, the latter being relatively nontoxic and with minimal residual odor. These organic peroxides may be utilized alone or as a mixture with other organic peroxides having the same or substantially similar characteristics. Peroxides of choice are dialkyl peroxides. Other peroxides of interest include those which have half-lives of decomposition on the order of seconds at the reaction temperature (about 230° C.) but which are safely stable at storage and ambient temperature. Decomposition products should preferably be volatile and relatively non-toxic. Many peroxides fit this category and choice is determined by economic considerations and physical form of the peroxide relative to efficiency of utilization. Many of the peroxides that are compatible with this invention are dialkyl peroxides but are not limited to this class. Specific examples are dicumyl peroxide, di-t-butyl peroxide, t-butyl cumyl peroxide and 2,5,dimethyl-2,5-bis(t-butylperoxy)hexene-3. The amount of peroxide and the cracking temperature depend upon the melt flows of the starting polymers and the desired melt flow of the final composition. If desired, the peroxide may be added in a masterbatch with mineral oil or other polymer. Suitable amounts of peroxide are between about 0.01% and about 0.25% by weight total polymer, preferably between about 0.025 and 0.12% by weight of total polymer. Typical visbreaking temperatures are between about 190° C. and about 250° C., preferably between about 220° C. and about 240° C.

Other methods for generating free radicals within the reactor blend can also be utilized. For example, the reactor blend can be subjected to a high energy source, e.g. electron beam irradiation, X-ray radiation, ultraviolet radiation and the like. Utilization of such other methods is also referred to herein as visbreaking.

Visbreaking cleaves portions of the reactor blend product to produce various forms of fragmented materials, for example, fragmented polypropylene material and, to a much lesser extent, fragmented polyethylene material, which may include olefinic fragments, block copolymer fragments, and copolymer fragments wherein one or more portions of the polypropylene and polyethylene fragments become grafted to one or more other fragments which may be the same or different. More particularly, these various forms of fragmented materials combine to form various graft materials. The presence of these grafts provides improved compatability between the polypropylene and the polyethylene phases, thereby significantly improving dispersion of the included phase as well as improving adhesion between the phases. For example, visbreaking a preferred reactor blend of the present invention, which comprises high molecular weight homopolypropylene and thermoplastic polyethylene, produces a variety of fragments. Representative examples of such fragments can be illustrated as follows:

Polypropylene portion of reactor blend + (1)

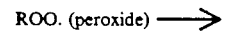

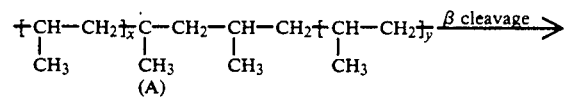

(A)

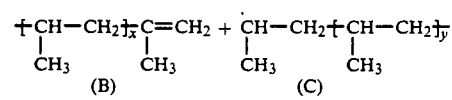

(B)  (C)

Polyethylene portion of reactor blend + ROO· ⟶ (2)

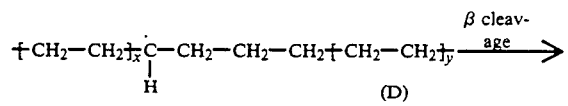

(D)

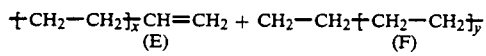

(E)  (F)

Reactions (1) and (2) are typically referred to as scission reactions and compete with another reaction referred to as linking (e.g., cross-linking of polyethylene). In the case of polypropylene, the scission reaction is thermodynamically preferred. Thus, polypropylene can be described as a free radical decomposable olefin. In the case of polyethylene, the linking reaction is preferred. Thus, the polyethylene can be described as a free radical crosslinkable olefin, and, in the present invention is a crosslinkable olefin plastic. Copolymers of ethylene and another monomer also undergo the linking reaction, although in certain instances, may under the scission reaction, depending on the amount of comonomer. In addition to the fragments illustrated above, block and graft copolymers would be expected to be formed as well by radical combination (i.e., linking) of radical C with radicals D or F. Certain ones of these particular fragments, which include varying amounts of propylene and ethylene, may prefer the scission reaction and others which prefer the linking reaction. The present invention is therefore directed to visbroken reactor blends of a free radical decomposable olefin and a free radical crosslinkable thermoplastic olefin.

Furthermore, although fragments (A) and (D) or (E) are the predominant fragment species, all of these fragments will be present at any given time and will eventually combine in varying arrangements to produce block or graft materials, the presence of which affect the reactor blend to modify certain physical characteristics thereof, such as impact resistance and stiffness.

In the present invention, which preferably involves low MFR, i.e., high molecular weight, homopolypropylene, more polypropylene fragments are necessarily produced to create the desired melt flow rate. Thus, an increased number of scission reactions occurs which leads to an increase in the number of grafts which in turn leads to an increase in impact resistance of the reactor blend.

Thus, the high impact polypropylene produced according to the teachings of the present invention can be tailored to have wide ranging physical properties suitable for a variety of applications without the addition of rubber. For example, for applications that require high stiffness and medium impact strength (i.e., battery cases and automotive interior trim) one might choose to produce a product with an essentially linear high density PE included or dispersed phase of high molecular weight product which on peroxide treatment, in the melt, would give the desired combination; conversely, if a product of very high impact strength but more modest stiffness is desired (i.e., luggage cases) one would choose a polyethylene included phase having a higher level of comonomer which on peroxide treatment would give the highest level of low temperature impact strength (although at some cost in reduced flexural modulus).

The foregoing more general discussion of this invention will be further exemplified by the following specific examples offered by way of illustration and are not a limitation of the above-described invention.

EXAMPLES

In the following examples, mechanical property evaluations were made employing the following tests:
(1) Melt Flow Rate--ASTM D-1238, Condition L.
(2) Flexural Modulus, secant--ASTM D-790.
(3) Notched Izod Impact--ASTM D-256.
(4) Gardner Impact--ASTM D-3029, Procedure B.

EXAMPLE 1

To a nitrogen purged 2 liter reactor fitted with a stirrer, the blades of which are a close fit to the reactor wall, there was introduced 4 ml of 0.1 molar diphenyldimethoxysilane in hexane, 4 ml of 1.0 molar triethylaluminum in hexane and 1250 ml of propylene. The reactor was brought to 70° C. and 352 mg of a 30% white oil slurry of a commercial titanium chloride supported catalyst (trade designation TK-20, available from Mitsui Petrochemical Industries, Ltd., of Tokyo, Japan) was added. The polymerization was allowed to proceed for 45 minutes after which the temperature was rapidly lowered to 35° C. and the reactor was vented of the unused propylene.

The vented reactor was tilted at a 45 angle and a gaseous flow of 100 mole% ethylene was introduced at a rate of 3.5 l/min. The reactor was maintained at 70° C. and 100 psig pressure of the gaseous reactants. Constant pressure was maintained by continuous venting of the excess reactants. The polymerization was allowed to proceed for 30 minutes after which the reactor was cooled to 35° C. and depressurized.

The polymer product was then recovered, dried, admixed with 1600 ppm of a 2,5-dimethyl-2,5-di(t-butylperoxy)hexane (commercial designation Lupersol 101, available from the Lucidol Division of the Penwalt Corp., Buffalo, N.Y.) as a 50/50 wt/wt solution in Sontex 350 white oil, and extruded in a Killron 1" single screw extruder (serial #5246) at 450° F. to yield a pelletized product. The pelletized product was compression molded in a Wabash 30 ton hydraulic press (Model No. 30-1515-2T2WCMB) to 0.125 inch thick plaques from which appropriate test specimens were die cut. The test results are presented in Table I.

COMPARATIVE EXAMPLE 1

The procedure set forth above in Example 1 was repeated in its entirety except for the following changes: (a) 25 psig of hydrogen was introduced into the liquid phase polymerization; (b) 355 mg of the 30wt% white oil slurry of the catalyst was utilized; and (c) no Lupersol 101 was added to the dried product.

The results are presented in Table I.

EXAMPLE 2

The procedure set forth above in Example 1 was repeated in its entirety except for the following changes: (a) 384 mg of the 30wt% white oil slurry of the catalyst was utilized; (b) a gaseous flow of 71 mole% ethylene and 29 mole% propylene was utilized as the feedstock to the gas phase polymerization; and (c) the dried product was admixed with 1273 ppm of Lupersol 101.

The results are presented in Table I.

COMPARATIVE EXAMPLE 2

The procedure set forth above in Example 1 was repeated in its entirety except for the following changes: (a) 25 psig of hydrogen was introduced into the liquid phase polymerization; (b) 345 mg of the 30wt% white oil slurry of the catalyst was utilized; (c) a gaseous flow of 71 mole% ethylene and 29 mole% propylene was utilized as the feedstock to the gas phase polymerization; and (d) no Lupersol 101 was added to the dried product.

The results are presented in Table I.

EXAMPLE 3

The procedure set forth above in Example 1 was repeated in its entirety except for the following changes: (a) 362 mg of the 30wt% white oil slurry of the catalyst was utilized, (b) a gaseous flow of 97 mole% ethylene and 3 mole% hydrogen was utilized as the feedstock to the gas phase polymerization, and (c) the dried product was admixed with 1630 ppm of Lupersol 101.

The results are presented in Table I.

COMPARATIVE EXAMPLE 3

The procedure set forth above in Example 1 was repeated in its entirety except for the following changes: (a) 25 psig of hydrogen was introduced into the liquid phase polymerization; (b) 362 mg of the 30wt% white oil slurry of the catalyst was utilized; (c) a gaseous flow of 97 mole% ethylene and 3 mole% hydrogen was utilized as the feedstock to the gas phase polymerization, and (d) no Lupersol 101 was added to the dried product.

The results are presented in Table I.

EXAMPLE 4

The procedure set forth above in Example 1 was repeated in its entirety except for the following changes: (a) 346 mg of the 30wt% white oil slurry of the catalyst was utilized; (b) a gaseous flow of 68.9 mole% ethylene, 29 mole% propylene and 2.1 mole% hydrogen was utilized as the feedstock to the gas phase polymerization; and (c) the dried product was admixed with 1406 ppm of Lupersol 101.

The results are presented in Table I.

COMPARATIVE EXAMPLE 4

The procedure set forth above in Example 1 was repeated in its entirety except for the following changes: (a) 25 psig of hydrogen was introduced into the liquid phase polymerization; (b) 346 mg of the 30wt% white oil slurry of the catalyst was utilized; (c) a gaseous flow of 68.9 mole% ethylene, 29 mole% propylene and 2.1 mole% hydrogen was utilized as the feedstock to the gas phase polymerization; and (d) no Lupersol 101 was added to the dried product.

The results are presented in Table I.

EXAMPLE 5

The procedure set forth above in Example 1 was repeated in its entirety except for the following changes: (a) 466 mg of the 30 wt% white oil slurry of the catalyst was utilized; (b) a gaseous flow of 100 mole% ethylene was utilized as the feedstock to the gas phase polymerization; and (c) the dried product was admixed with 900 ppm of Lupersol 101.

The results are presented in Table I.

COMPARATIVE EXAMPLE 5

The procedure set forth above in Example 1 was repeated in its entirety except for the following changes: (a) 466 mg of the 30 wt% white oil slurry of the catalyst was utilized; (b) a gaseous flow of 100 mole% ethylene was utilized as the feedstock to the gas phase polymerization; and (c) no Lupersol 101 was added to the dried product.

The results are presented in Table I.

COMPARATIVE EXAMPLE 6

The procedure set forth above in Example 1 was repeated in its entirety except for the following changes: (a) 25 psig of hydrogen was introduced into the liquid phase polymerization; (b) 350 mg of the 30 wt% white oil slurry of the catalyst was utilized, (c) a gaseous flow of 100 mole% ethylene was utilized as the feedstock to the gas phase polymerization; and (d) no Lupersol 101 was added to the dried product.

The results are presented in Table I.

COMPARATIVE EXAMPLE 7

The procedure set forth above in Example 1 was repeated in its entirety except for the following changes: (a) 25 psig of hydrogen was introduced into the liquid phase polymerization; (b) 350 mg of the 30wt% white oil slurry of the catalyst was utilized; (c) the reactor was pressurized to 50 psig with hydrogen for five minutes, and then released, prior to the ethylene addition to terminate, by chain transfer, any remaining polymer chains on the living catalyst; and (d) the dried product was admixed with 1280ppm of Lupersol 101.

The results are presented in Table I.

Table I set forth below includes synthesis conditions relating to whether utilization was made of polypropylene, and/or hydrogen in the ethylene polymerization phase and hydrogen in the propylene polymerization phase or peroxide visbreaking to set the product MFR. To facilitate mathematical analysis, utilizing multiple linear regression techniques, as described in "Applied Regression Analysis" (by N. R. Draper and H. Smith, John Wiley & Sons, Inc; N.Y. (1981)), these synthesis conditions are suitably coded as follows:

(a) −1=0 mole% propylene in feed to gas phase polymerization;
+1=29 mole% propylene in feed to gas phase polymerization (b) −1=0 mole % hydrogen in feed to gas phase polymerization
+1=ca. 3 mole% hydrogen in feed to gas phase polymerization (c) −1=no peroxide visbreaking of product
+1=peroxide visbreaking of product (d) −1=no hydrogen in propylene polymerization
+1=hydrogen present in propylene polymerization (e) Measured by differential scanning calorimetry The data from Examples 1-5 and Comparative Examples 1-6 were used in the mathematical analysis to generate the results shown in Tables II and III.

TABLE I

| Example No. | MFR | Flex. Mod. 2% Secant | RTNI | Gard. Impact @ −18° C. | C3/Pe (a) | H2/PE (b) | R202 CR (c) | H2/PP (d) | Melt. Pt. PE, °C. (e) |
|---|---|---|---|---|---|---|---|---|---|
| 1 | 8.0 | 113.0 | 1.2 | 15 | −1 | −1 | +1 | −1 | 122.4 |
| 2 | 24.3 | 88.7 | 1.6 | 99 | +1 | −1 | +1 | −1 | 110.0 |
| C 1 | 2.1 | 151.9 | 1.3 | 43 | −1 | −1 | −1 | +1 | 126.3 |
| C 2 | 3.6 | 139.7 | 1.9 | 69 | +1 | −1 | −1 | +1 | 118.4 |
| 3 | 26.2 | 149.4 | 0.7 | 12 | −1 | +1 | +1 | −1 | 125.3 |
| 4 | 20.0 | 95.2 | 1.1 | 39 | +1 | +1 | +1 | −1 | 116.6 |
| C 3 | 4.6 | 170.3 | 0.9 | 16 | −1 | +1 | −1 | +1 | 126.5 |
| C 4 | 5.2 | 158.5 | 1.4 | 39 | +1 | +1 | −1 | +1 | 119.7 |
| 5 | 0.6 | 138.9 | — | 134 | −1 | −1 | +1 | −1 | 128.1 |
| C 5 | 0.8 | 154.8 | — | 137 | −1 | −1 | −1 | −1 | 130.9 |
| C 6 | 9.1 | 159.1 | — | 50 | −1 | −1 | −1 | +1 | 130.0 |
| C 7 | 6.6 | 180.9 | 0.9 | 8 | −1 | −1 | +1 | +1 | 128.8 |

TABLE II

Dependent Variable: Gardner
Intercept = 111.326393

| VARIABLE | COEFFICIENT | 1 SIGMA | TSTAT (5 D.F.) |
|---|---|---|---|
| C3/PE | 18.830253 | 11.1301561 | 1.69182289 |
| H2/PE | −13.7565781 | 11.4827041 | −1.198026 |
| CR | 18.9819282 | 11.7099279 | 1.62101153 |

TABLE II-continued

| | | | |
|---|---|---|---|
| C3 PE*CR | 13.04563 | 10.5989862 | 1.23083753 |
| LOG(MFR) | −30.1264343 | 11.003636 | −2.73786178 |
| R Squared = .747678721 | | | |
| F(5,5) = 2.96320123 | | | |

TABLE III

Dependent Variable: Flex. Mod.
Intercept = 135.165517

| VARIABLE | COEFFICIENT | 1 SIGMA | TSTAT (6 D.F.) |
|---|---|---|---|
| C3/PE | −14.6405173 | 2.77945076 | −5.2674138 |
| H2/PE | 8.18448275 | 2.77945076 | 2.94464032 |
| CR | −20.9431035 | 2.72092945 | −7.69704024 |
| C3 PE*CR | −7.63189656 | 2.72092945 | −2.80488587 |
| R Squared = .939490752 | | | |
| F(4,6) = 23.3895991 | | | |

Considering the regression on the dependent variable of Gardner impact strength, the positive coefficients for the synthesis variables of propylene in the gas phase polymerization and visbreaking of the product show that each of these have a marked positive effect on Gardner impact. It should also be noted that a large positive term appears for the product of the above two variables so that their use, in combination, is particularly desirable. The negative coefficients for the synthesis variables of hydrogen in the gas phase polymerization and log(MFR) show that the highest impact strength obtains when a high molecular weight polyethylene is produced and when the MFR of the final composite product is as low as possible.

In general, regression on the dependent variable of flexural modulus shows the reverse dependence on the synthesis variables, i.e; the higher the impact, the lower the flexural modulus. An exception is that the flexural modulus is indicated to be independent of the MFR.

The melting point data on the polyethylene phase of the composition tends to substantiate the fact that graft molecules are formed in the visbreaking steps. In each case, the visbroken material has a reduced polyethylene melting point relative to the non-visbroken counterpart. This reduced melting point implies improved compatibility and intermixing at phase boundries, made possible by the increasing concentration of grafted molecules in the visbroken case.

Also, the amount of melting point depression is greatest with high molecular weight propylene copolymerized polyethylene. This result probably derives because each radical combination event produces a greater weight of graft when the polyethylene macroradical is very high molecular weight itself. More grafting for the propylene copolymerized polyethylene derives because of the increased propensity of tertiary-hydrogens to free radical abstraction so that more sites for grafting by combination become available in this case.

The coefficients from the regressions can be used to estimate the properties of products not included in the set analyzed. For instance, the expected properties of Comparative Example 7 can be calculated. Results of this calculation predict the following vs. the found properties:

| Comparative Example 7 - Predicted vs Actual Properties | |
|---|---|
| Predicted Gardner Impact @ −18° C. | 56 |
| Actual Gardner Impact @ −18° C. | 8 |
| Predicted Flexural Modulus | 128.3 |

| Comparative Example 7 - Predicted vs Actual Properties | |
|---|---|
| Actual Flexural Modulus | 180.9 |

The poor predictive power of the expressions for Comparative Example 7 clearly show that this material is from another population set. This result shows that it is important in operation of the invention to avoid termination of growing chains in the interval between the homopolymerization of propylene and the as phase (co)polymerization of the ethylene if optimal impact strength is to be obtained. That is, mere physical blends, as opposed to reactor blends, are outside the scope of this invention. The result also indicates that products of the invention could not be obtained by simple blending of the ingredients whether the product is visbroken or not.

The predictive equations can also be utilized to compare properties of a set of the subject materials at equal melt flow rates. For instance, in Table IV the calculated moduli and Gardner impact strengths are shown for a common 5 MFR.

TABLE IV

Calculated Properties of Selected Materials Corrected to 5 MFR

| Condition | C3 in PE | H2 in PE | Visbreak product | Flex. Mod. | Gardner @ −18 C |
|---|---|---|---|---|---|
| 1 | no | yes | no | 145,000 | 37 |
| 2 | no | no | no | 128,000 | 64 |
| 3 | yes | yes | no | 100,000 | 99 |
| 4 | yes | no | no | 84,000 | 127 |
| 5 | no | yes | yes | 171,000 | 25 |
| 6 | no | no | yes | 155,000 | 52 |
| 7 | yes | yes | yes | 157,000 | 35 |
| 8 | yes | no | yes | 141,000 | 63 |
| Sum Gard for: | yes = 324 no = 178 | | yes = 196 no = 306 | | yes = 327 no = 175 |

This set of calculated results represents the eight vertices of a cube in three demensional experimental space. Because the set is balanced, the sum of the vertices on a side versus the sum of the vertices on the opposite side allows qualitative evaluation of the effect of the selected control variable on the response variables while mixing the non-selected control variables. The sums for this qualitative evaluation are shown in Table IV.

It is clear from the above treatment that optimization of the product impact strength requires addition of propylene in the polyethylene synthesis step, production of a relatively high molecular weight polyethylene phase material, and a melt phase treatment of the composite product with a free radical source. These results are consistent with a process wherein polymeric radicals produced by the free radical source terminate by radical combination to produce graft/block molecules which then function to assist in dispersion of the included polyethylene phase and also to assure adequate adhesion between the matrix and included phases.

It is contemplated that utilization of methods for generating free radicals other than by utilization of peroxides will produce impact-modified polypropylene materials having substantially similar physical properties as those exemplified above, more particularly materials within the above-described mathematically-derived population set. Furthermore, it is contemplated that free radical decomposable olefins and free radical crosslinkable thermoplastic olefin other than those exemplified above, such as polypropylene and polyethylene thermoplastic materials, particularly as described herein, will produce useful impact-modified polypropylene materials as well.

The compositions of this invention may include stabilizers and additives conventionally employed in similar polyolefin compositions, such as antioxidants, stabilizers against actinic radiation, antistatic additives, crystallinity nucleating agents, pigments and mineral fillers.

The compositions of this invention are useful for automobile trim parts, battery containers, appliance parts and the like and, particularly, due to the compatibility characteristics described above, for multilayered plastic articles such as bottles and food trays and the like.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for preparing a high impact propylene polymer composition which does not contain rubber materials comprising:
   a. polymerizing propylene or a mixture of propylene and one or more monomers selected from $C_2$ or $C_4$-$C_{10}$ alpha olefins in the presence of a Ziegler catalyst, wherein a substantially isotactic propylene polymer containing at least about 90 wt.% of polymerized propylene is obtained;
   b. polymerizing ethylene or a mixture of ethylene and one or more $C_3$ to $C_{10}$ alpha olefin monomers in the presence of the propylene polymer composition of step (a) and optionally in the presence of additional Ziegler catalyst wherein a reactor blend comprising a continuous phase propylene polymer and a discontinuous phase thermoplastic polymer containing at least about 90 wt% of polymerized ethylene is obtained;
   c. recovering the reactor blend of step (b); and
   d. heating said reactor blend of step (c) in the presence of a free radical source to provide a visbroken reactor blend.

2. The process of claim 1 wherein said heating in step (d) is conducted at a temperature of at least about 190° C.

3. The process of claim 1 wherein said free radical source is selected from the group consisting of an organic peroxide, electron beam irradiation, x-ray radiation and ultraviolet radiation.

4. The process of claim 3 wherein said free radical source is an organic peroxide.

5. The process of claim 1 wherein said propylene polymer is polypropylene.

6. The process of claim 5 wherein said polypropylene has a MFR less than about 1.0 dg/min.

7. The process of claim 5 wherein said polypropylene has an MFR less than about 0.5 dg/min.

8. The process of claim 5 wherein said polypropylene has an MFR less than about 0.2 dg/min.

9. The process of claim 1 wherein said ethylene polymer is polyethylene.

10. The process of claim 9 wherein said polyethylene is linear low density polyethylene.

11. The process of claim 1 wherein said Ziegler catalyst is a titanium-containing catalyst.

12. The process of claim 1 wherein said step (a) polymerization is conducted in the liquid phase and said step (b) polymerization is conducted in the gaseous phase.

13. The process of claim 1 wherein said propylene polymer composition product of step (a) comprises a mixture of propylene polymer and catalyst.

14. The process of claim 1 wherein said visbroken reactor blend contains at least about 70 wt.% of said propylene polymer.

15. The process of claim 14 wherein said visbroken reactor blend contains from about 70 to about 95 wt% of propylene polymer and from abut 5 to about 30 wt% of ethylene polymer.

16. The process of claim 1 wherein step (a) is conducted in the substantial absence of chain terminating agents.

17. A high impact propylene polymer composition produced by the process of claim 1.

* * * * *